United States Patent [19]

Burton

[11] 4,292,792
[45] Oct. 6, 1981

[54] ADJUSTABLE HARVESTING MACHINE FOR BLUEBERRIES AND OTHER PLANTS

[75] Inventor: Charles G. Burton, Lewiston, N.Y.

[73] Assignee: Chisholm-Ryder Company, Inc., Niagara Falls, N.Y.

[21] Appl. No.: 53,817

[22] Filed: Jul. 2, 1979

[51] Int. Cl.³ .......................................... A01D 46/00
[52] U.S. Cl. .................................................... 56/330
[58] Field of Search ................... 56/330, 331, 329, 328

[56] References Cited

U.S. PATENT DOCUMENTS

| | | | |
|---|---|---|---|
| 1,776,133 | 9/1930 | Prindle | 403/218 |
| 3,959,959 | 6/1976 | Louault et al. | 56/330 |
| 4,063,406 | 12/1977 | Burton | 56/336 |
| 4,077,193 | 3/1978 | Diggs | 56/330 |
| 4,114,463 | 9/1978 | Garden et al. | 56/330 |

FOREIGN PATENT DOCUMENTS 2403734  9/1977  France .................. 56/330

*Primary Examiner*—Robert A. Hafer
*Attorney, Agent, or Firm*—Joseph P. Gastel

[57] ABSTRACT

An adjustable mechanism for the spoke-carrying shaft of a harvesting machine for blueberries and other plants including a first shaft for receiving rotary motion, a second shaft offset from and parallel to the first shaft, harvesting spokes mounted in tiers on and projecting radially from the second shaft, a first screw adjustment for varying the distance between the first and second shafts to thereby vary the orbit of the second shaft, counterweight members mounted relative to the second shaft, second screw adjustments for varying the positions of the counterweight members to correspond with the adjusted position of the second shaft to thereby balance the second shaft in all adjusted positions thereof, with certain of the spokes having their outer ends inclined upwardly relative to the horizontal while other spokes have their outer ends inclined downwardly relative to the horizontal so that the projection of the outer ends of the spokes in a vertical direction provides relatively great vertical coverage of the plant being harvested, and mounting structure for varying the inclination of the spokes.

19 Claims, 10 Drawing Figures

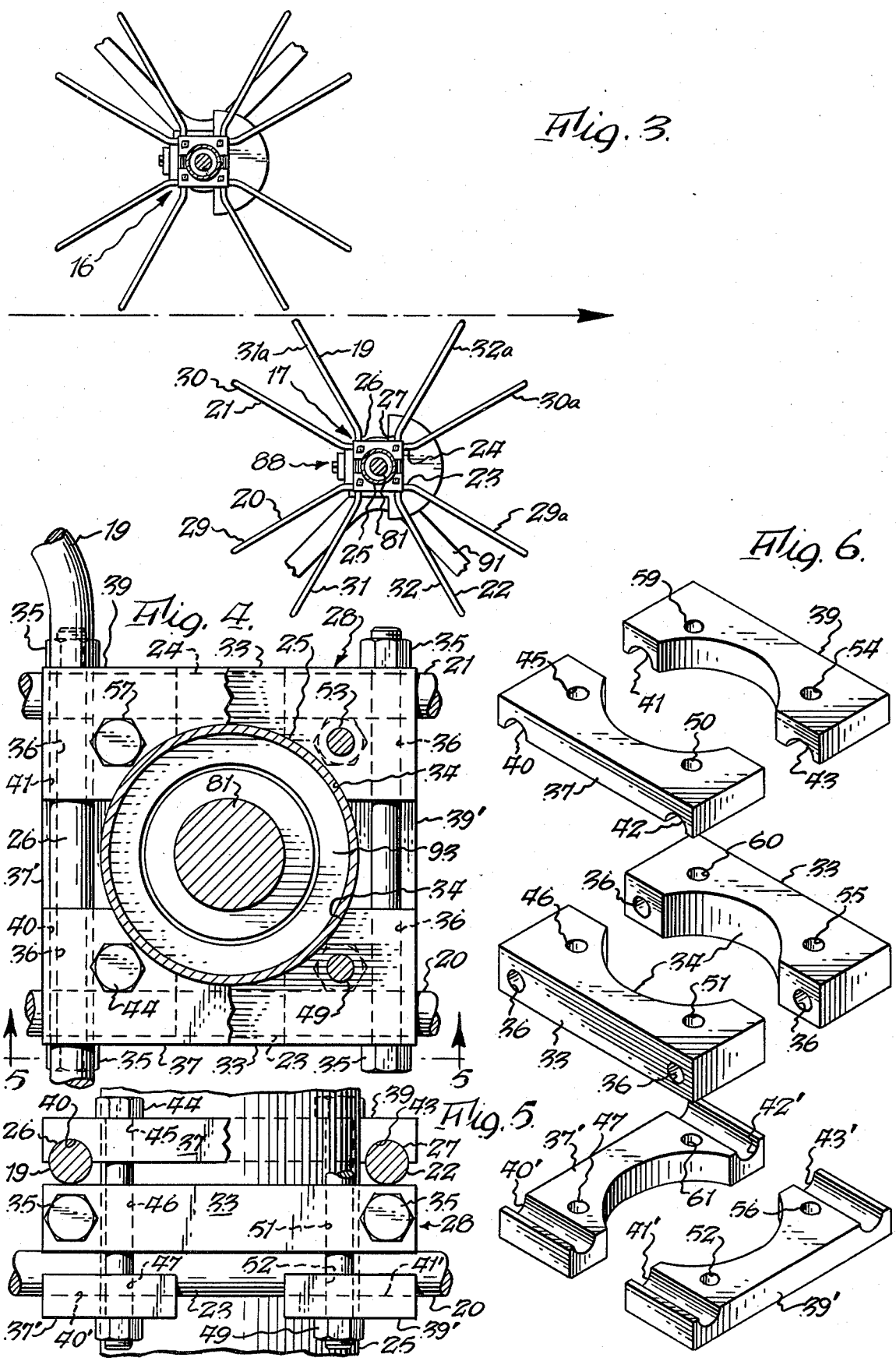

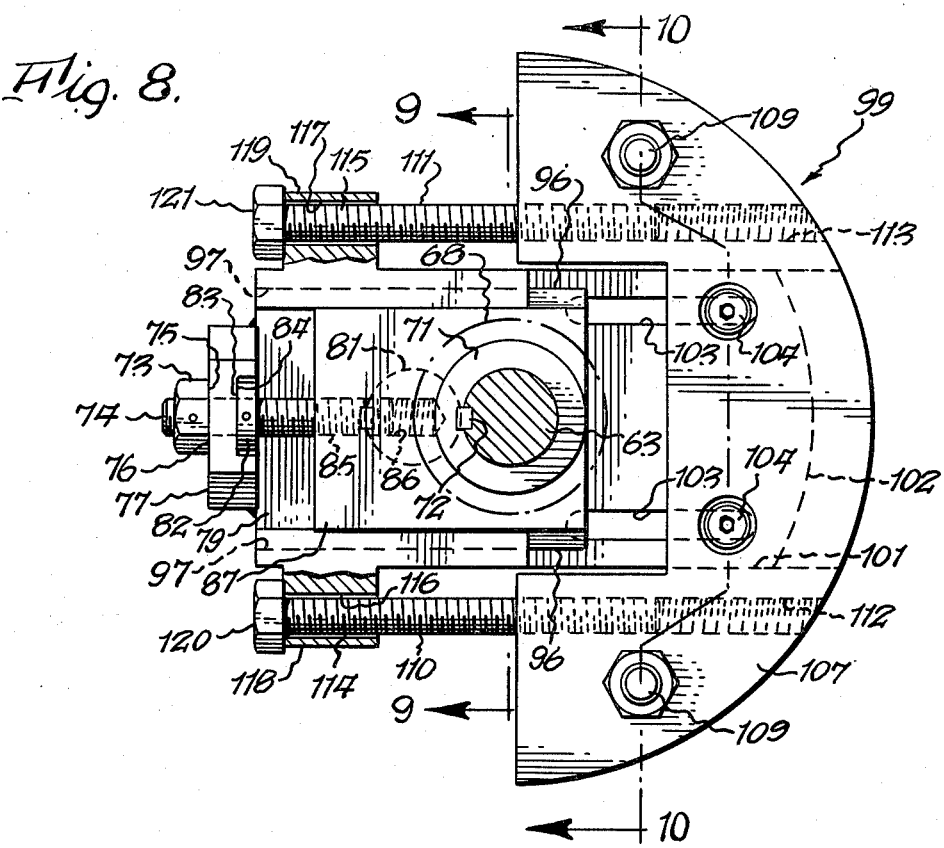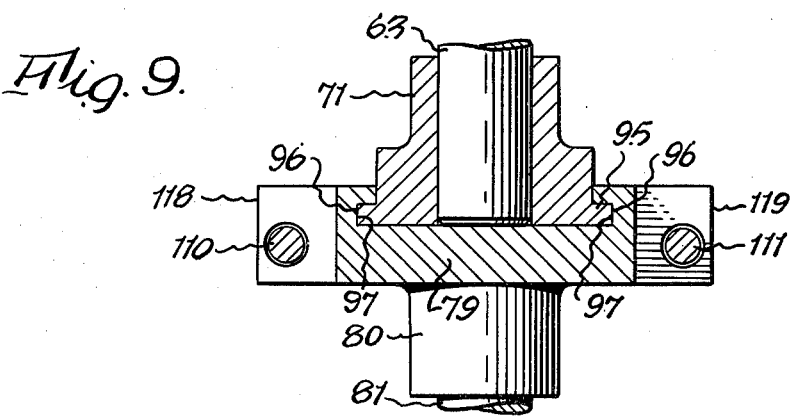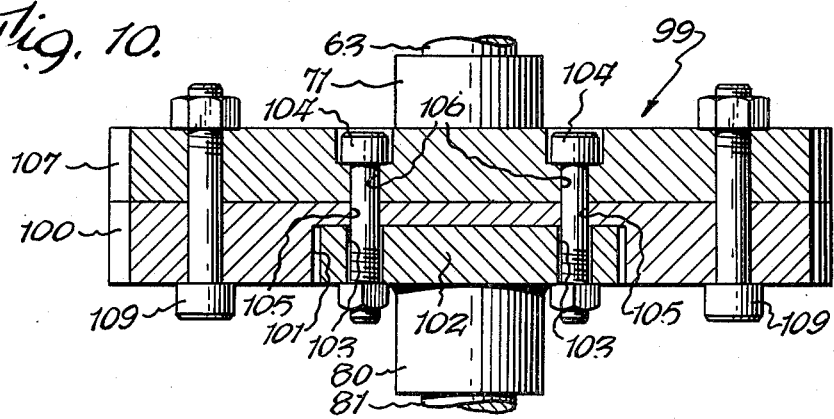

ADJUSTABLE HARVESTING MACHINE FOR BLUEBERRIES AND OTHER PLANTS

BACKGROUND OF THE INVENTION

The present invention relates to a harvesting machine for blueberries and other plants having an improved spoke-carrying mechanism which has an adjustable orbit and in which the spokes are adjustably inclined to the horizontal.

By way of background, blueberry harvesting machines are known wherein a spoke-carrying shaft is journalled for free rotation and is driven in an orbit so that the spokes jab in and out of blueberry bushes while they "walk" through the bushes as a result of the free rotation of the shaft. However, in the prior machine, there was no arrangement for adjusting the orbit of movement of the spoke-carrying shaft. Thus, the blueberry bushes were always subjected to the same amount of spoke thrust, although the speed of orbital movement could be changed.

I have discovered that successful harvesting depends on a combination of the speed and magnitude of orbital movement. Thus, for harvesting varieties of blueberries which are easily bruised, it is desirable to have a relatively small orbital movement and low speed. Other varieties can be harvested with a larger orbital stroke and low speed, and yet other varieties which are difficult to harvest may be subjected to relatively large orbital spoke movement and relatively high speeds. The ultimate objective is to remove as many ripe blueberries as gently as possible, while permitting the unripe berries to remain on the bushes for subsequent harvesting.

In addition, insofar as known, the spokes of prior blueberry harvesters were generally stacked in tiers, and they were generally parallel to each other. This only provided contact with a relatively small portion of the bush, and therefore berries on the bush which were located between the tiers of spokes, were generally not harvested to the fullest extent. It is with overcoming the foregoing deficiencies of the prior art that the present invention is concerned.

SUMMARY OF THE INVENTION

It is the object of the present invention to provide an improved harvester for blueberries and other plants in which the orbit of spoke movement can be adjusted to meet varying harvesting conditions. A related object of the present invention is to provide an adjustable counterweight structure which is used in conjunction with the orbit adjusting structure so that the orbiting spokes are balanced in all adjusted positions, thereby obviating any vibration which could be caused by unbalanced spokes.

Another object of the present invention is to provide an improved spoke arrangement for a harvesting machine for blueberries and other plants wherein the outer ends of the spokes are inclined to the horizontal in such a manner so that the projection of said spokes onto the plant being harvested covers a substantial vertical portion of the plant. A related object is to provide an improved spoke arrangement wherein the inclination of the spokes is adjustable. Other objects and attendant advantages of the present invention will readily be perceived hereafter.

The present invention relates to an adjustment mechanism for the spoke-carrying shaft of a harvesting machine comprising first shaft means for defining a first axis, a second shaft having a second axis offset from and substantially parallel to said first axis, a plurality of vertically spaced spokes on said second shaft, means mounting said second shaft for movement in an orbit about said first axis, and adjusting means for adjusting the position of said second axis relative to said first axis to thereby vary the size of said orbit. In accordance with another aspect of the present invention, counterweight means are mounted relative to said second shaft, and counterweight adjusting means are provided for adjusting the position of said counterweight means to provide balance in all adjusted positions of said second shaft. In accordance with still another aspect of the present invention, the spokes include outer end portions which are inclined to the horizontal, and, more specifically, the outer end portions of certain of said spokes are inclined upwardly, and certain of said spokes are inclined downwardly. In accordance with yet another aspect of the invention, the spokes are mounted so that the inclination of their outer ends can be adjusted. The various aspects of the present invention will be more fully understood when the following portions of the specification are read in conjunction with the accompanying drawings wherein:

BRIEF DESCRIPTION OF THE DRAWINGS

FIG. 3 is a fragmentary cross sectional view taken substantially along line 3—3 of FIG. 1, with certain portions of FIG. 1 omitted in the interest of clarity, and showing the relationship between the two sets of spokes in plan;

FIG. 4 is a fragmentary enlarged cross sectional view taken substantially along line 4—4 of FIG. 7, and showing the structure for mounting each tier of spokes on its associated freely rotatable tubular spoke-supporting shaft;

FIG. 5 is a fragmentary cross sectional view taken substantially along line 5—5 of FIG. 4;

FIG. 6 is an exploded view showing the parts of the spoke-mounting structure;

FIG. 8 is a cross sectional view, partially broken away, taken substantially along line 8—8 of FIG. 7 and showing further details of the spoke-adjusting structure and the adjustable counterweight structure;

FIG. 9 is a fragmentary cross sectional view taken substantially along line 9—9 of FIG. 8 and showing further details of the spoke-adjusting structure and adjustable counterweight structure; and FIG. 10 is a fragmentary cross sectional view taken substantially along line 10—10 of FIG. 8 and showing further details of the adjustable counterweight structure.

DESCRIPTION OF THE PREFERRED EMBODIMENTS

Figure 1:
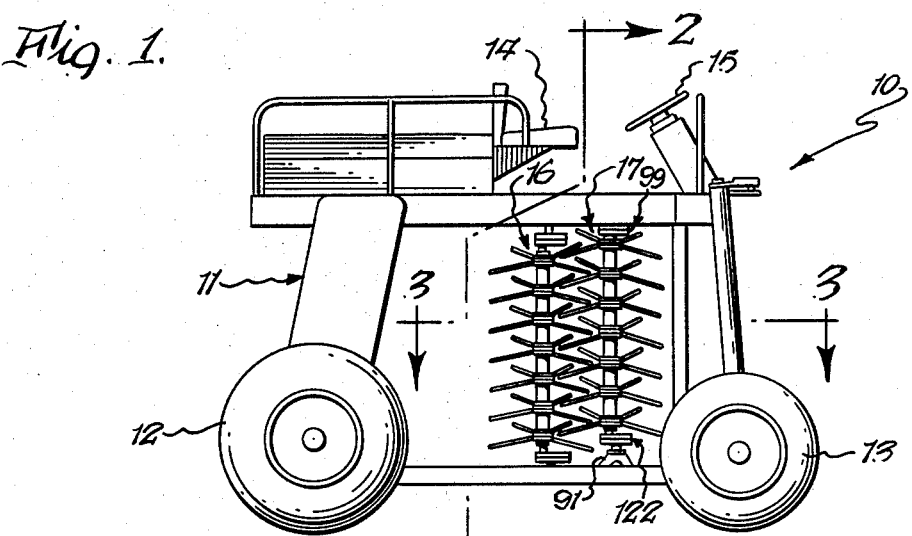
FIG. 1 is a side elevational view of a harvester mounting the improved adjustable harvesting mechanism of the present invention.

The improved harvester 10 of the present invention, which is intended for harvesting blueberries and may be used for other plants, includes a frame 11 which is supported by a pair of rear wheels 12 and a pair of front wheels 13. A driver sits on seat 14 and manipulates steering wheel 15 to guide the blueberry harvester 10 so that blueberry bushes are straddled by spaced sets 16 and 17 of freely rotatable orbiting spokes which penetrate the blueberry bushes from opposite sides as the blueberry harvester is driven along rows of blueberry bushes. In this manner blueberries are shaken loose from the bushes and dropped on collector leaves (not shown) below spoke sets 16 and 17 from which they slide onto a conveyor (not shown) extending lengthwise of frame 11 by which they are conveyed to collecting boxes mounted on frame 11. Since all features described above, except for the structure of the spoke sets 16 and 17, are conventional, it is deemed not necessary to describe such conventional structure, and therefore the following portions of the specification will be directed toward the structure of spoke sets 16 and 17.

Summarizing in advance, the improved spoke set structure of the present invention provides improved harvesting in a number of respects. First of all, a better harvesting yield is obtained, and secondly the improved yield will be obtained with less damage to the bushes. The improved yield is obtained for a number of reasons. Firstly, the spokes 19 and 20 are tilted at different angles, as will be described in greater detail hereafter, and therefore as such freely rotatable spokes orbit during their travel along and into the bushes, a greater area of contact with the bushes will be obtained than was heretofore obtained with spokes which were oriented only in a horizontal plane. Furthermore, the orbit in which the spokes move is adjustable, by structure which will be described in greater detail hereafter, and therefore the orbit can be adjusted for different varieties of bushes and for the season during which harvesting is being performed. In this respect, if the bushes have to be agitated more vigorously, the orbit of the spokes is increased and vice versa. Furthermore, in view of the fact that the orbit of the spokes is adjustable, an adjustable counterweight mechanism is provided for balancing the orbiting spokes so that the machine frame 11 is not caused to vibrate unnecessarily. By adjusting the speed and magnitude of orbital spoke movement, the ultimate objective of a blueberry harvester is attained, namely, to remove a maximum portion of the ripe berries from the bushes as gently as possible, so as to leave the unripe berries for a subsequent harvesting, after they have ripened. Thus, the adjustments are conducive to the selective harvesting of blueberries which permits the same bushes to be harvested three to four times a year and to remove only those berries which are properly ripened. Furthermore, by causing the harvesting action to be as gentle as possible, by a combination of varying the size and speed of the orbit, those blueberries which are harvested are very unlikely to become damaged, and thus there will be a greater harvesting yield.

Figure 2:
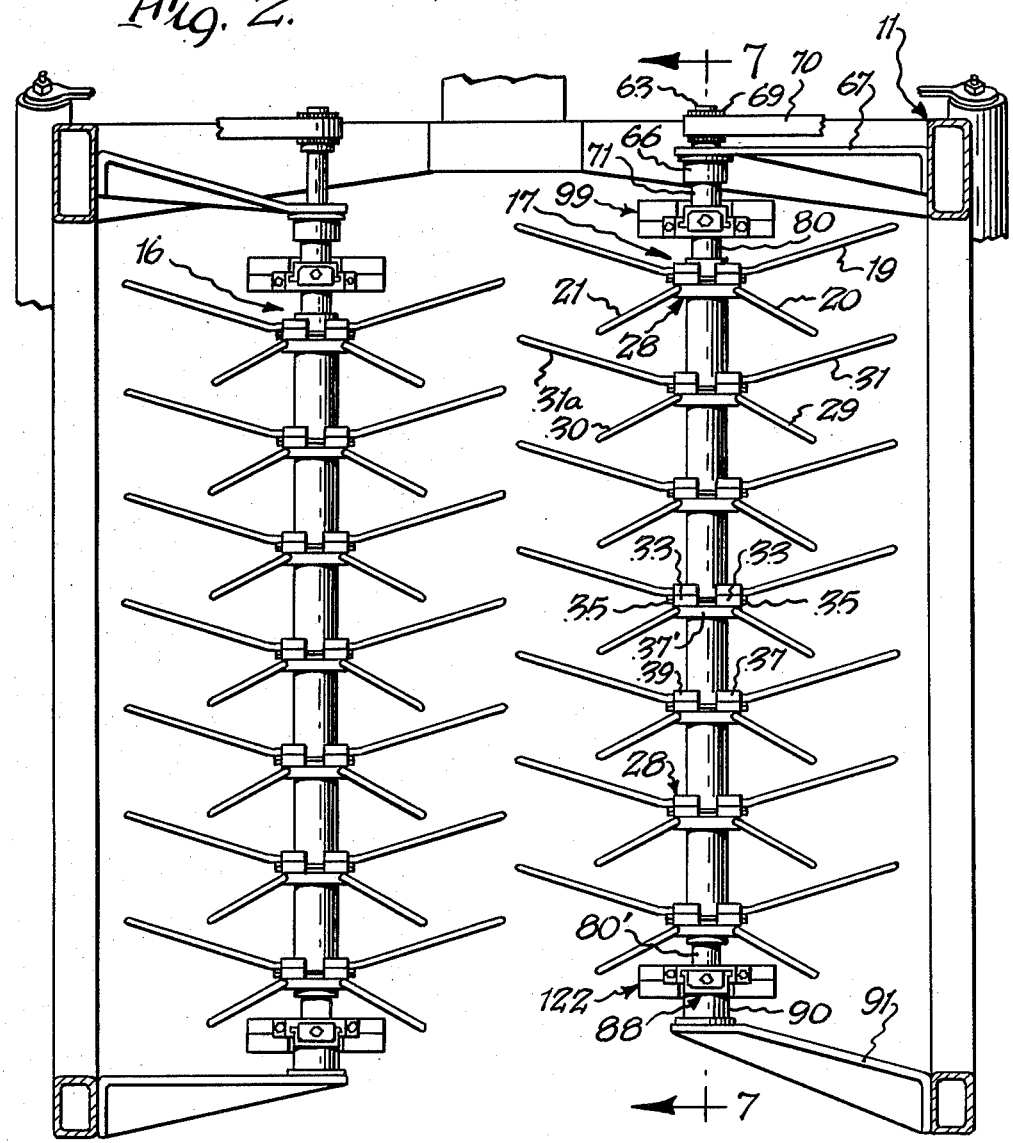
FIG. 2 is a fragmentary cross sectional view taken substantially along line 2—2 of FIG. 1 and showing the relationship, in rear elevation, of the two sets of spokes which penetrate plants from opposite directions.

As can be seen from FIG. 2, spoke sets 16 and 17 each consist of seven tiers of spokes, with the tiers of set 16 being vertically staggered with respect to the tiers of set 17. At this point it is to be noted that spoke sets 16 and 17 are substantially identical, except for the staggered relationship of the tiers of spokes mounted thereon and therefore the following portions of the description will be confined primarily to spoke set 17, and it will be understood that spoke set 16 contains either identical or analogous structure. In addition, it is to be noted that spoke set 17 lies forward of set 16 in the direction of the longitudinal axis of the machine (FIGS. 1 and 3).

Each tier on spoke set 17 includes mirror image counterpart spoke sets 20-21 and 19-22. Spokes 20-21 include central portions 23 and 24, respectively, which are clamped onto tubular spoke shaft 25, and spokes 19 and 22 include central portions 26 and 27, respectively, which are also clamped onto spoke shaft 25. Spokes 20 and 21 include outer downwardly inclined end portions 29 and 30, respectively. The opposite ends 29a and 30a of spokes 20 and 21 are also downwardly inclined at the same angle as outer end portions 29 and 30. Spokes 19 and 22 have outer upwardly inclined end portions 31 and 32, respectively, and the opposite end portions 31a and 32a of spokes 19 and 22, respectively, are inclined upwardly at the same angle to the horizontal as end portions 31 and 32, respectively. It can thus be seen that as shaft 25 orbits, the outer end portions of spokes 19, 20, 21 and 22 will project vertically a relatively large distance to thereby provide effective contact with substantially the entire vertical extent of the blueberry bushes. The outer ends of spokes 20 and 21 project downwardly approximately 15 degrees from the horizontal and the outer ends of spokes 19 and 22 project upwardly approximately 15 degrees from the horizontal.

The central portions 23, 24, 26 and 27 of spokes 20, 21, 19 and 22, respectively, are mounted on hollow tubular spoke shaft 25 in the following manner. Central block portions 33 (FIG. 6) have concave portions 34 which fit in complementary engagement with the outside of shaft 25. Nut and bolt assemblies 35 extend through aligned bores 36 in opposed blocks 33 to clamp blocks 33 securely on shaft 25. The central portions 26 and 27 of spokes 19 and 22, respectively, are thereafter laid across the tops of blocks 33 in a direction parallel to bores 36. Thereafter, mirror image counterpart blocks 37 and 39 are placed in engagement with the tops of central portions 26 and 27 of rods 19 and 20, respectively, so that these central portions are received in semicylindrical concavities in blocks 37 and 39. In this respect, spaced parts of central portion 26 are received in semicylindrical concavities 40 and 41 of blocks 37 and 39, respectively, and spaced portions of central portion 27 are received in semicylindrical concavities 42 and 43 of blocks 37 and 39, respectively. Thereafter, central portions 23 and 24 of spokes 20 and 21, respectively, are brought up into engagement with the undersides of blocks 33 in a direction substantially perpendicular to bores 36. Thereafter, blocks 37' and 39', which are identical to blocks 37 and 39 but inverted, are brought up to receive the central portions 23 and 24 of spokes 20 and 21, respectively. In this respect, spaced portions of central portion 23 are received in semicylindrical cutouts 40' and 41' of blocks 37' and 39', respectively. The central portion 24 of spoke 21 is positioned in a similar manner and clamped against the undersurfaces of blocks 33 by being received in semicylindrical cutouts 42' and 43' of blocks 37' and 39', respectively. Thereafter, nut and bolt assembly 44 is passed through aligned bores, 45, 46 and 47 in blocks 37, 33 and 37', respectively. Nut and bolt assembly 49 is passed through aligned bores 50, 51 and 52. Nut and bolt assembly 53 is passed through aligned bores 54, 55 and 56, and nut and bolt assembly 57 is passed through aligned bores 59, 60 and 61. It will readily be appreciated that when nut and bolt assemblies 44, 49, 53 and 57 are tightened, the central spoke portions 23, 24, 26 and 27 will be firmly clamped in position on hollow shaft 25. It will also be appreciated that the central portion of each spoke can be pivoted about its longitudinal axis to adjust the angle which the outer end portions of the spokes makes with the horizontal, to thereby adjust the angle of attack of the spoke end portions relative to the blueberry bushes. However, it has been found that the optimum angle of attack is approximately 15 degrees, as noted above, but this angle may be varied to meet different conditions. It is also to be noted that each fastening assembly 28 is identical for each tier of spokes.

Figure 7:
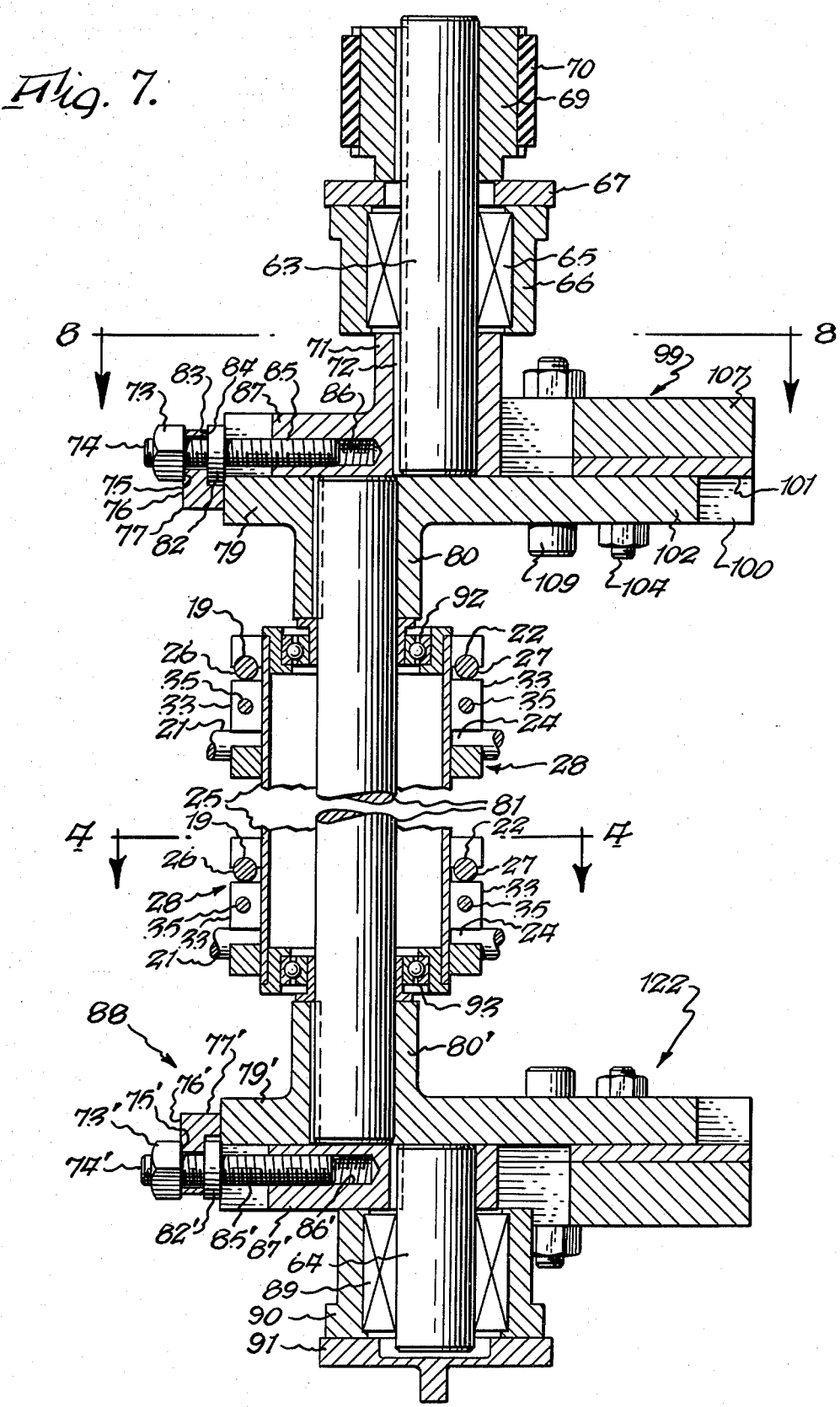
FIG. 7 is a fragmentary cross sectional view taken substantially along line 7—7 of FIG. 2 and showing the structure for mounting the spoke-supporting shaft for adjusting its orbit of movement and also showing the structure for adjustably mounting counterweight structure for balancing the spoke shaft in all of its adjusted positions.

In accordance with another aspect of the present invention, the hollow shaft on which the tiers of spokes are mounted can be adjusted to vary its orbit for different types of blueberry bushes and for different harvesting conditions. In this respect, the orbit 68 (FIG. 8) of spoke shaft 25 may be adjusted about the axis of vertically aligned shafts 63 and 64 (FIG. 7). More specifically, shaft 63 is journalled in bearing 65 carried in housing 66 supported by bracket 67 secured to machine frame 11, and shaft 64 is journalled in housing 90. A pulley 69 is keyed to shaft 63 and is encircled by a belt 70 driven from a suitable variable speed hydraulic motor (not shown). A boss 71 is keyed to shaft 63 by means of key 72. Boss 71 is part of the adjusting mechanism for varying the orbit of shaft 25. Spoke set 16 is mounted on the machine by analogous structure. In order to adjust the position of shaft 25, nut 73 is rotated. Nut 73 is pinned to screw 74 and nut surface 75 bears against surface 76 of yoke 77 which is fixedly secured to base 79 of the adjusting mechanism. A boss 80 extends downwardly from base 79 and shaft 81 is keyed therein. A collar 82 is pinned to screw 74 and its surface 83 bears against surface 84 of yoke 77. The end 85 of screw 74 is thready received in tapped bore 86 in base 87 of boss 71. Therefore, as nut 73 is rotated, base 79 will be moved from right to left or left to right, in FIG. 7, depending on the direction of rotation of screw 74. The bottom of boss 71 is formed into a slide member 95 having outer edge portions 96 which are slidably received in undercut portions 96 in block 79. It is by this mechanism in conjunction with the above-described screw 74 and its associated parts that shaft 81 is adjusted. An analogous adjustment mechanism is shown generally at 88 at the bottom of FIG. 7. This adjustment mechanism operates in substantially the same manner as the adjusting mechanism described above, and therefore a detailed explanation is not deemed necessary. Accordingly, parts of lower adjustment mechanism 89 which correspond to the parts of upper adjustment mechanism in FIG. 7 will be designated only by primed numerals corresponding to unprimed numerals of the adjusting structure in the upper portion of FIG. 7. It is to be noted, however, that the lowermost portion of shaft 81 is received in boss 80' forming a part of base 79', which corresponds to base 79. It is to be further noted that shaft 64 is mounted in bearing 89 mounted within housing 90 which is secured to bracket 91 mounted on machine frame 11. It will be appreciated that whenever screw 74 is used to make an adjustment for the upper portion of shaft 81, a corresponding adjustment must be made with lower screw 74' so as to maintain the axis of shaft 81 perfectly vertical.

An upper bearing 92 is interposed between an upper portion of shaft 81 and an upper portion of hollow spoke shaft 25. A lower bearing 93 is interposed between a lower portion of shaft 81 and the lower portion of hollow spoke shaft 25. Thus, hollow spoke shaft 25 is mounted for free rotation on shaft 81 so that the various spokes can "walk" through the blueberry bushes as shaft 81 orbits about the axes of aligned shafts 63 and 64.

It will be appreciated that whenever the centers between the axis of shaft 81, on one hand, and the axis of shafts 63 and 64, on the other hand, is changed, the balance of the assembly will be changed. If the assembly is not balanced, great vibration will be experienced especially when it is considered that shaft 63 is intended to rotate at between approximately 600 and 1200 rpm, depending on the variety of blueberries being harvested. Accordingly, a balancing counterweight structure is provided to permit shaft 81 to move in any adjusted orbit without producing an accompanying vibration. The counterweight structure 99 includes a generally semicylindrical counterweight member 100 having a cutaway central portion 101 (FIG. 10) which receives portion 102 of base 79. A pair of elongated slots 103 are formed in base 102. The lower portions of bolts 104 are received in slots 103, and the upper portions of bolts 104 are received in bores 105 of counterweight 100. The upper portions of bolts 104 also extend through bores 106 of upper counterweight portion 107 which is clamped to lower counterweight 100 by means of bolts 109.

When it is desired to adjust the position of counterweights 100 and 107, it is merely necessary to turn screws 110 and 111 which are threadably received in tapped bores 112 and 113, respectively, in lower counterweight 100. The portions 114 and 115 of screws 110 and 111, respectively, are received in unthreaded bores 116 and 117 in bosses 118 and 119, respectively, formed integrally with base 79. It will be appreciated that after bolts 104 are loosened and after screws 110 and 111 are turned, and after the counterweights have been moved to the proper position so that the heads 120 and 121 of screws 110 and 11, respectively, abut bosses 118 and 119, respectively, bolts 104 are then retightened to clamp the counterweights in their adjusted position relative to base 79. Set screws (not shown) may be provided for locking screws 110 and 111 in their adjusted positions. It will be appreciated that while no calibrations are shown on the counterweight, such calibrations may be provided to enhance the ease of adjustment. It will also be appreciated that a lower counterweight assembly 122 is provided at the lower end of shaft 81, and this counterweight assembly contains structure which is analogous to that described above relative to FIGS. 8-10. It will be appreciated that both counterweight assemblies 95 and 122 have to be adjusted in order to properly balance shaft 81. In this respect, as can be readily visualized from FIG. 7, if shaft 81 is adjusted to the left, then counterweights 95 and 122 have to be moved to the right to compensate therefor and vice versa.

It is to be again noted that both spoke sets 16 and 17 contain the same orbit adjusting, balancing, and spoke structure, but only the structure associated with spoke set 17 has been described in the interest of brevity.

It will further be appreciated that while the foregoing specification has been primarily directed to harvesting blueberry bushes, the present invention may also be used for harvesting other types of berries including grapes, and also for various other types of fruits, and therefore the claims have not been limited to any particular type of plants.

It can thus be seen that the improved harvester of the present invention is manifestly capable of achieving the above-enumerated objects, and while preferred embodiments of the present invention have been disclosed, it will be appreciated that the present invention is not limited thereto, but may be otherwise embodied within the scope of the following claims.

What is claimed is:

1. An adjustment mechanism for the spoke-carrying shaft of a harvesting machine comprising first shaft means for defining a first axis, a second shaft having a second axis offset from and substantially parallel to said first axis, a plurality of vertically spaced spokes on said second shaft, means mounting said second shaft for movement in an orbit about said first axis, and adjusting means for adjusting the position of said second axis relative to said first axis to thereby vary the size of said orbit.

2. An adjustment mechanism as set forth in claim 1 including counterweight means mounted relative to said second shaft, and counterweight adjusting means for adjusting the position of said counterweight means to provide balance in all adjusted positions of said second axis.

3. An adjustment mechanism as set forth in claim 2 wherein said spokes include outer end portions which are inclined to the horizontal.

4. An adjustment mechanism as set forth in claim 3 wherein the outer end portions of certain of said spokes are inclined upwardly and certain of said spokes are inclined downwardly.

5. An adjustment mechanism as set forth in claim 1 wherein said adjusting means comprises first base means mounted on said first shaft means, and second base means mounted on said first base means, means mounting said second shaft on said second base means, and means interconnecting said first and second base means for relative movement.

6. An adjustment mechanism as set forth in claim 5 including counterweight means mounted relative to said second shaft, and counterweight adjusting means for adjusting the position of said counterweight means to provide balance in all adjusted positions of said second axis.

7. An adjustment mechanism is set forth in claim 6 wherein said counterweight adjusting means comprises second means effectively extending between said second base means and said counterweight means.

8. An adjustment mechanism as set forth in claim 1 including a mounting portion on each spoke, an outer end portion on each spoke inclined transversely to said mounting portion, and mounting means for mounting said mounting portion on said second shaft in proximate relation thereto.

9. An adjustment mechanism as set forth in claim 1 wherein said second shaft has a longitudinal axis, a mounting portion on each spoke, an outer end portion on each spoke inclined in a vertical direction relative to said longitudinal axis, and mounting means for mounting said mounting portion on said spoke-carrying shaft in proximate relation thereto.

10. An adjustment mechanism as set forth in claim 8 wherein said mounting means include means for permitting pivotal movement of each of said mounting portion to vary the inclination of said outer end portions relative to the horizontal.

11. An adjustment mechanism as set forth in claim 9 wherein certain of said outer end portions are inclined upwardly and certain of said outer end portions are inclined downwardly.

12. A spoke-shaft construction for a harvesting machine comprising a spoke-carrying shaft, means for mounting said shaft for rotation about a vertical axis, a plurality of spoke members, a central portion on each spoke member, an outer end portion on each spoke member inclined transversely to said central portion, and mounting means for mounting said central portions on said spoke-carrying shaft in proximate relation thereto, said mounting means including means for permitting pivotal movement of said central portions to vary the inclination of said outer end portions relative to the horizontal without varying the inclination of the outer portions relative to the central portions.

13. A spoke-like construction as set forth in claim 12 wherein each of said spoke members has a pair of outer end portions inclined transversely to said central portion.

14. A spoke-like construction as set forth in claim 13 including a plurality of tiers of spoke members on said spoke-carrying shaft.

15. A spoke-like construction as set forth in claim 14 wherein certain of said outer end portions are inclined upwardly and certain of said outer end portions are inclined downwardly to thereby cause the vertical projection of said spoke members to cover a substantial portion of the plant being harvested.

16. A spoke-like construction as set forth in claim 15 wherein certain of said outer end portions in each tier are inclined upwardly, and certain of said outer end portions in each tier are inclined downwardly.

17. A spoke-shaft construction for a harvesting machine comprising a spoke-carrying shaft having a longitudinal axis, means for mounting said shaft for rotation about a substantially vertical axis, a plurality of spoke members, a mounting portion on each spoke member, an outer end portion on each spoke member inclined in a vertical direction relative to said longitudinal axis, and mounting means for mounting said mounting portions on said spoke-carrying shaft in proximate relation thereto, said mounting means including means for permitting pivotal movement of said mounting portions to vary the inclination of said outer end portions relative to said longitudinal axis without varying the inclination of the outer portions relative to the mounting portions.

18. A spoke-shaft construction as set forth in claim 17 wherein certain of said end portions are inclined upwardly and certain of said end portions are inclined downwardly.

19. A spoke construction as set forth in claim 17 wherein said outer end portions extend transversely to said mounting portions.

* * * * *

UNITED STATES PATENT AND TRADEMARK OFFICE
CERTIFICATE OF CORRECTION

PATENT NO. : 4,292,792
DATED : October 6, 1981
INVENTOR(S) : Charles G. Burton

It is certified that error appears in the above-identified patent and that said Letters Patent are hereby corrected as shown below:

In the Abstract, line 1, change "adjustable" to --adjustment--.

Column 8, line 5, (claim 10), change "portion" to --portions--;
         line 23, (claim 13), change "spoke-like" to --spoke-shaft--;
         line 29, (claim 14), change "spoke-like" to --spoke-shaft--;
         line 32, (claim 15), change "spoke-like" to --spoke-shaft--;
         line 38, (claim 16), change "spoke-like" to --spoke-shaft--;
         line 60, (claim 19), change "spoke" to --spoke-shaft--.

Signed and Sealed this

Twenty-second Day of December 1981

[SEAL]

Attest:

GERALD J. MOSSINGHOFF

*Attesting Officer*     *Commissioner of Patents and Trademarks*